C. H. OCUMPAUGH.
VOTING MACHINE.
APPLICATION FILED DEC. 7, 1903.
984,149.
Patented Feb. 14, 1911.
14 SHEETS—SHEET 1.
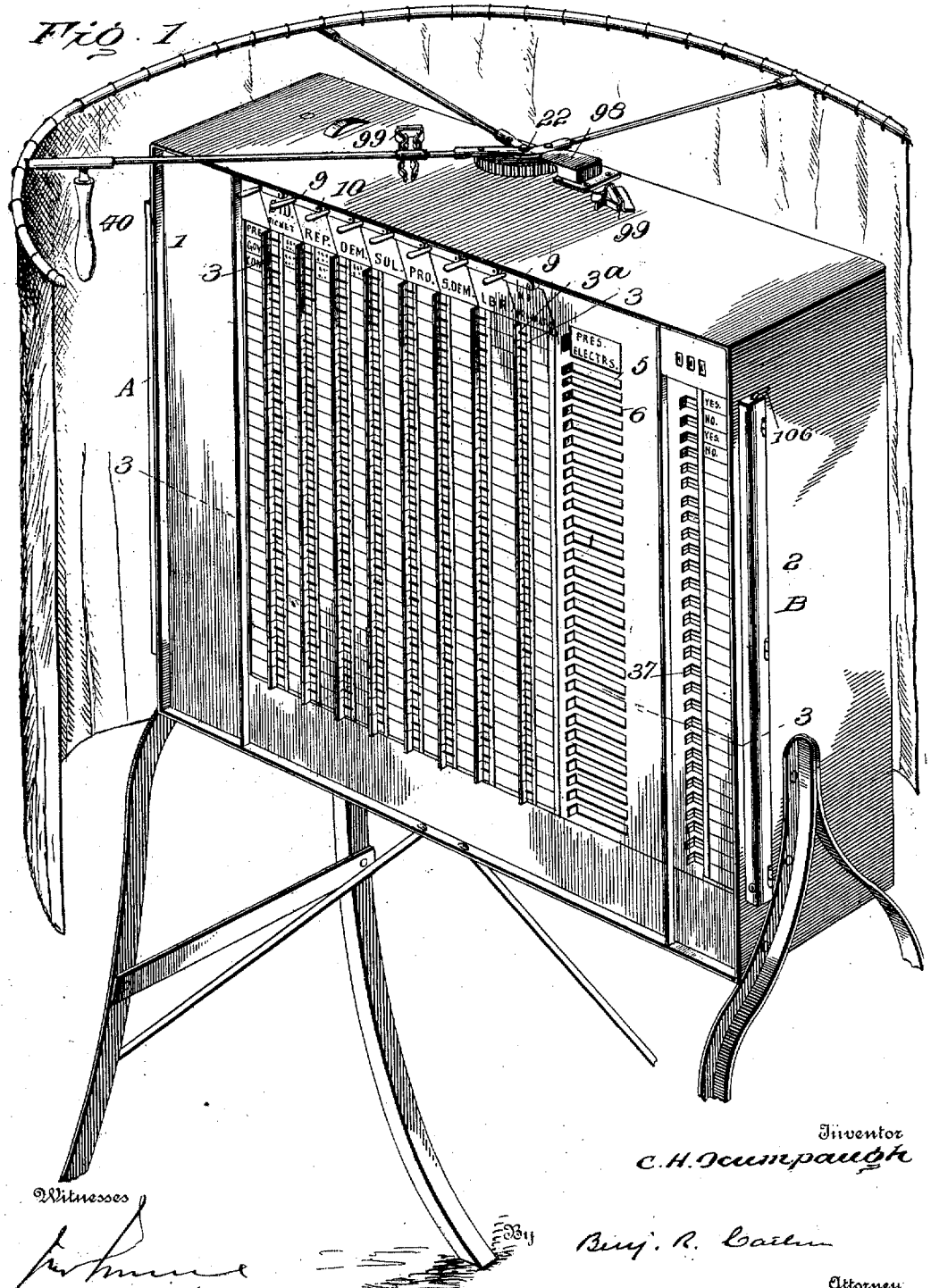

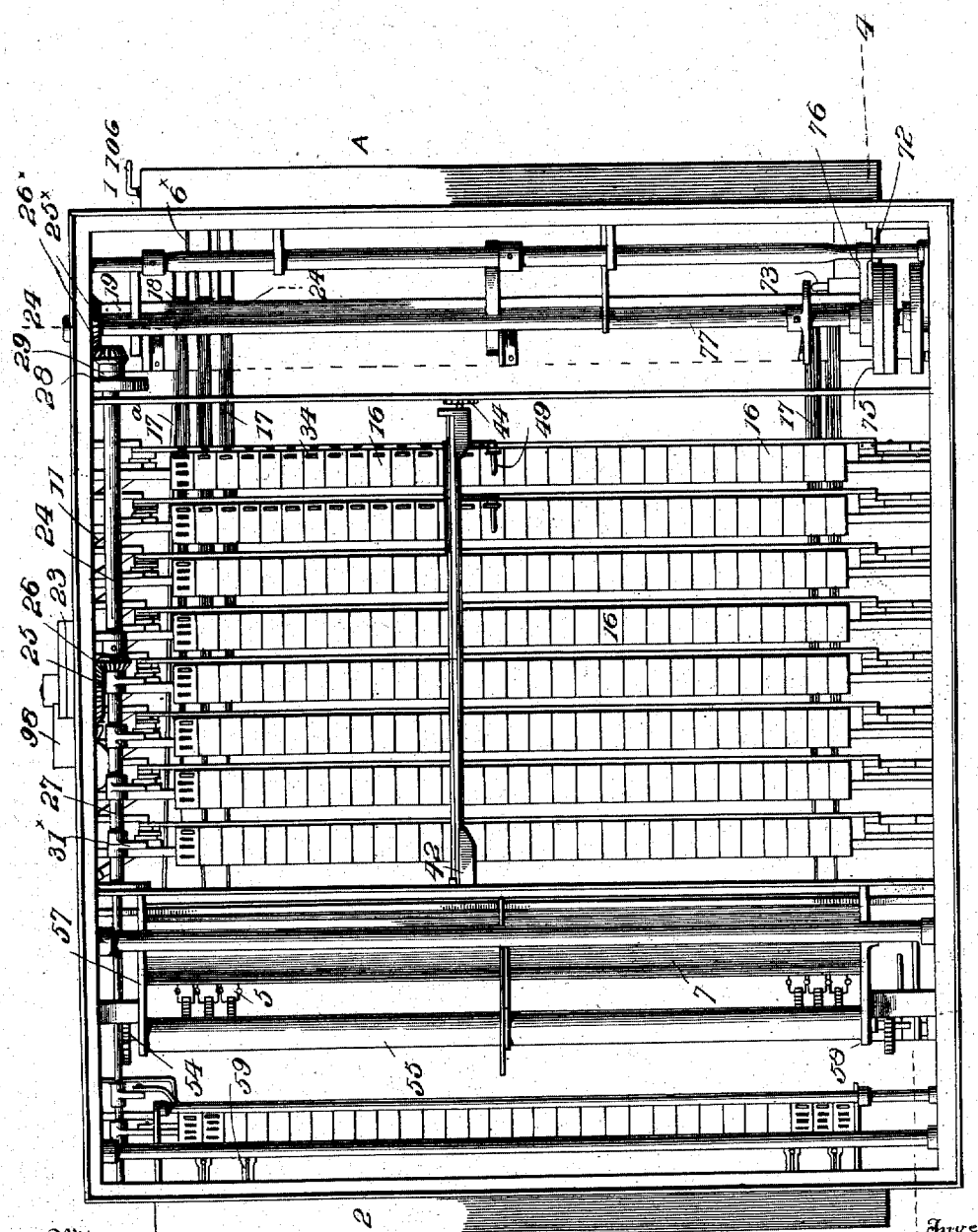

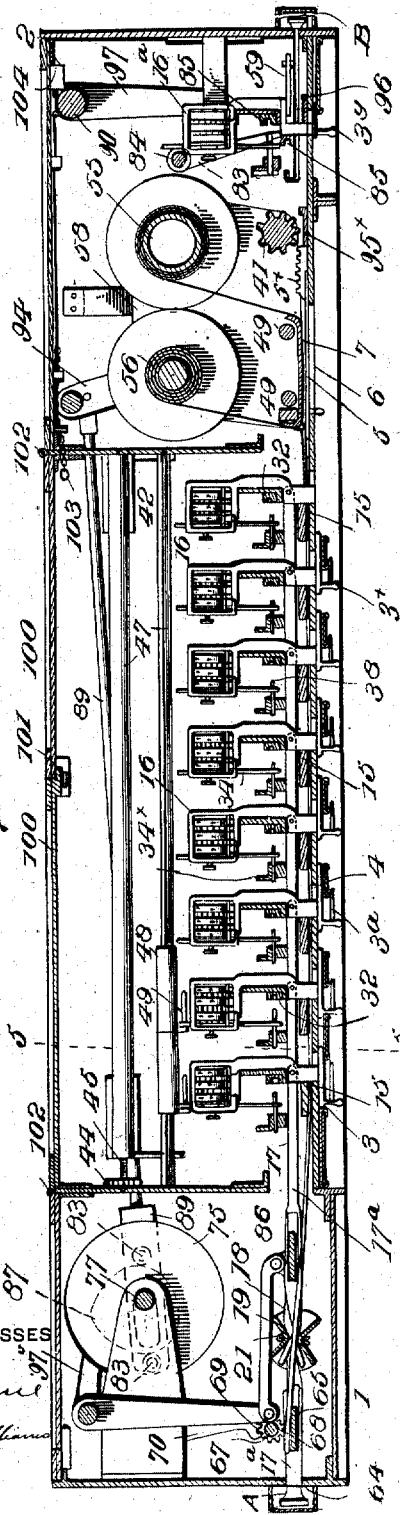

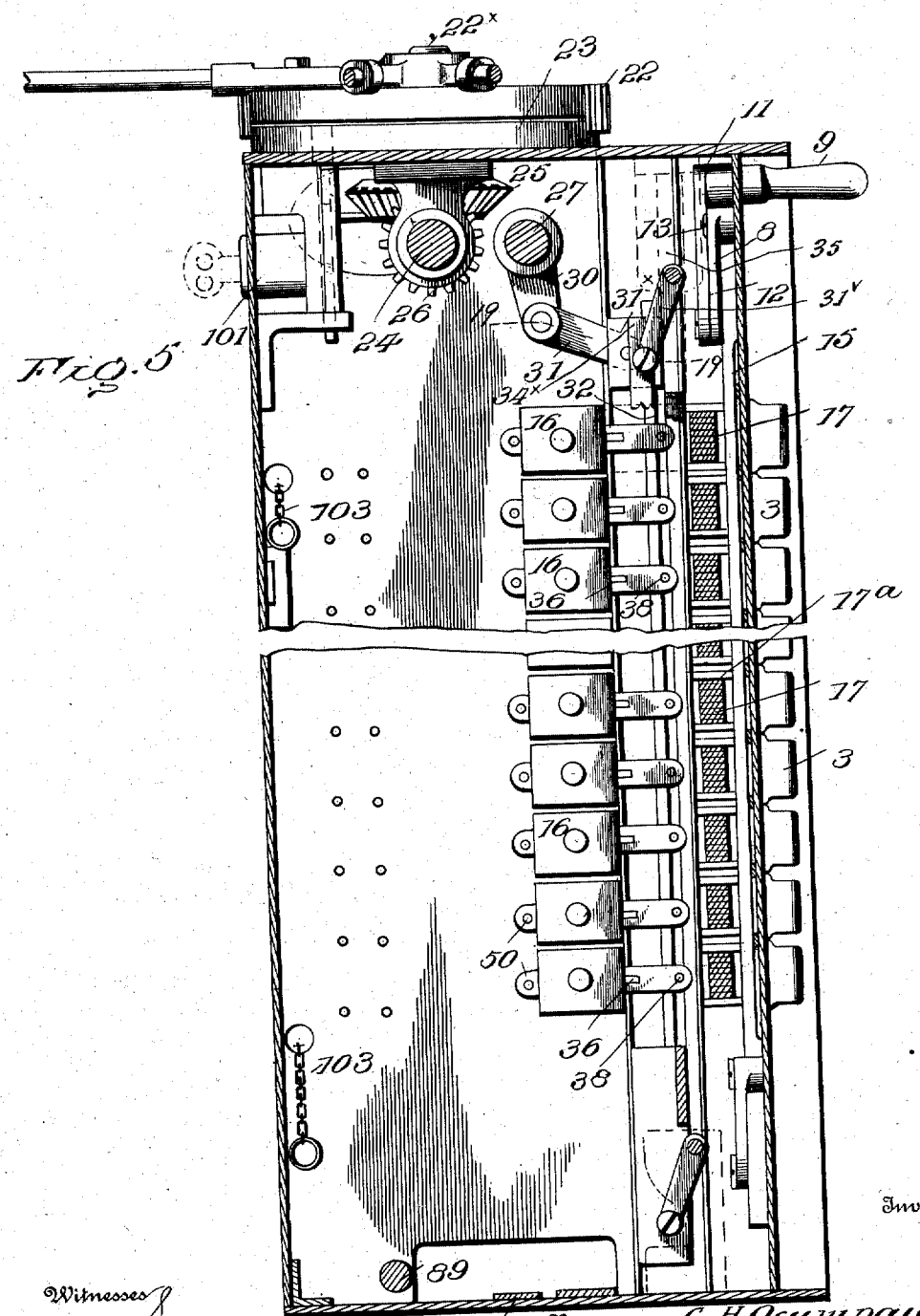

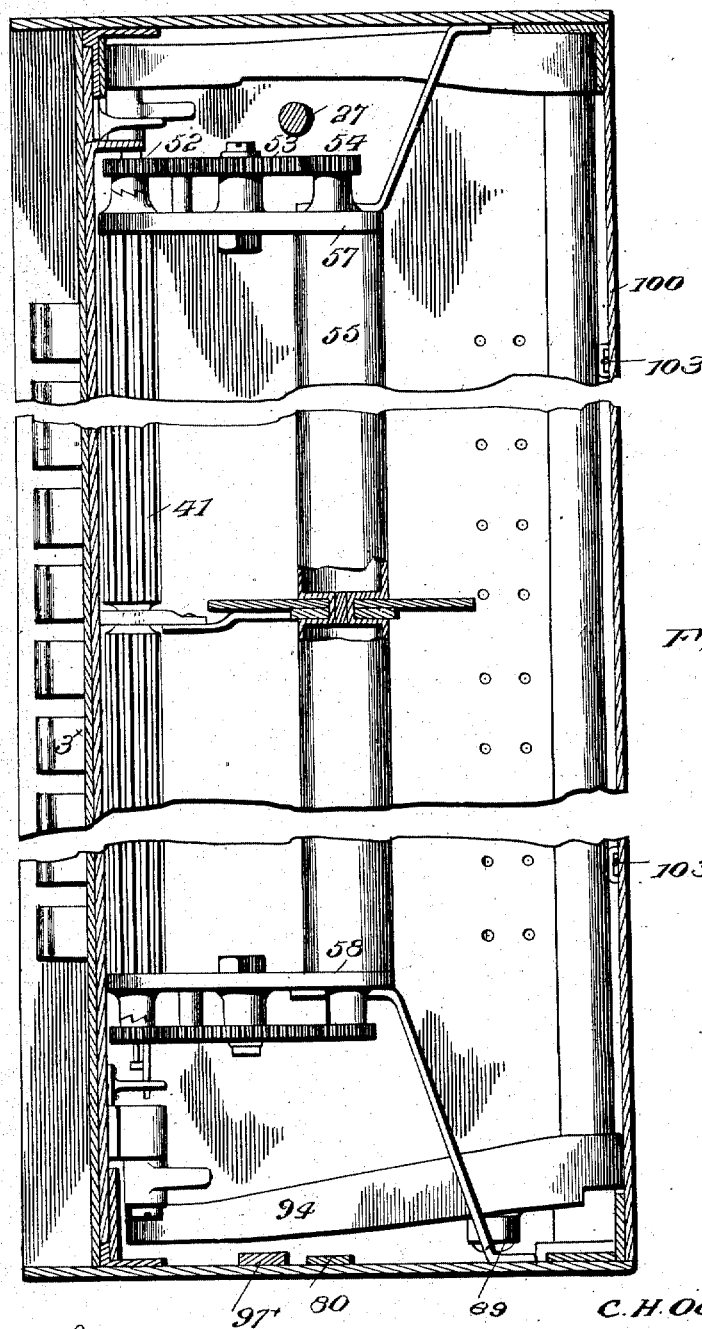

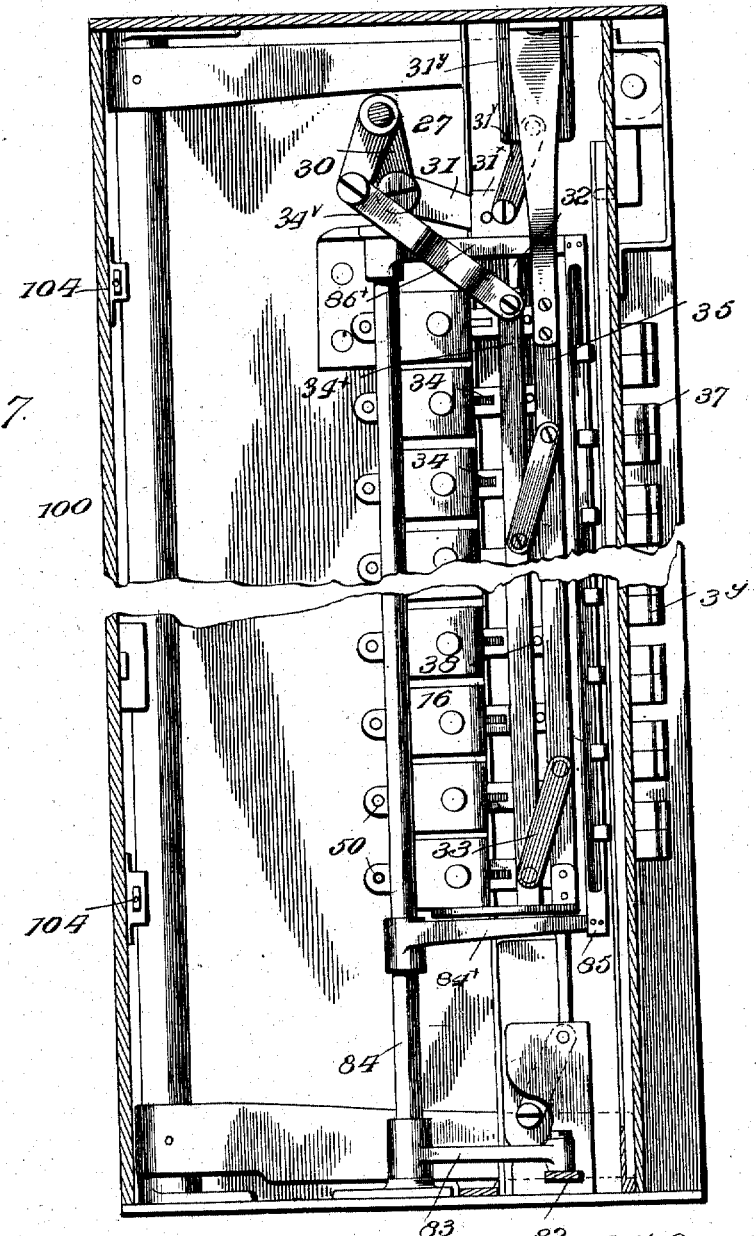

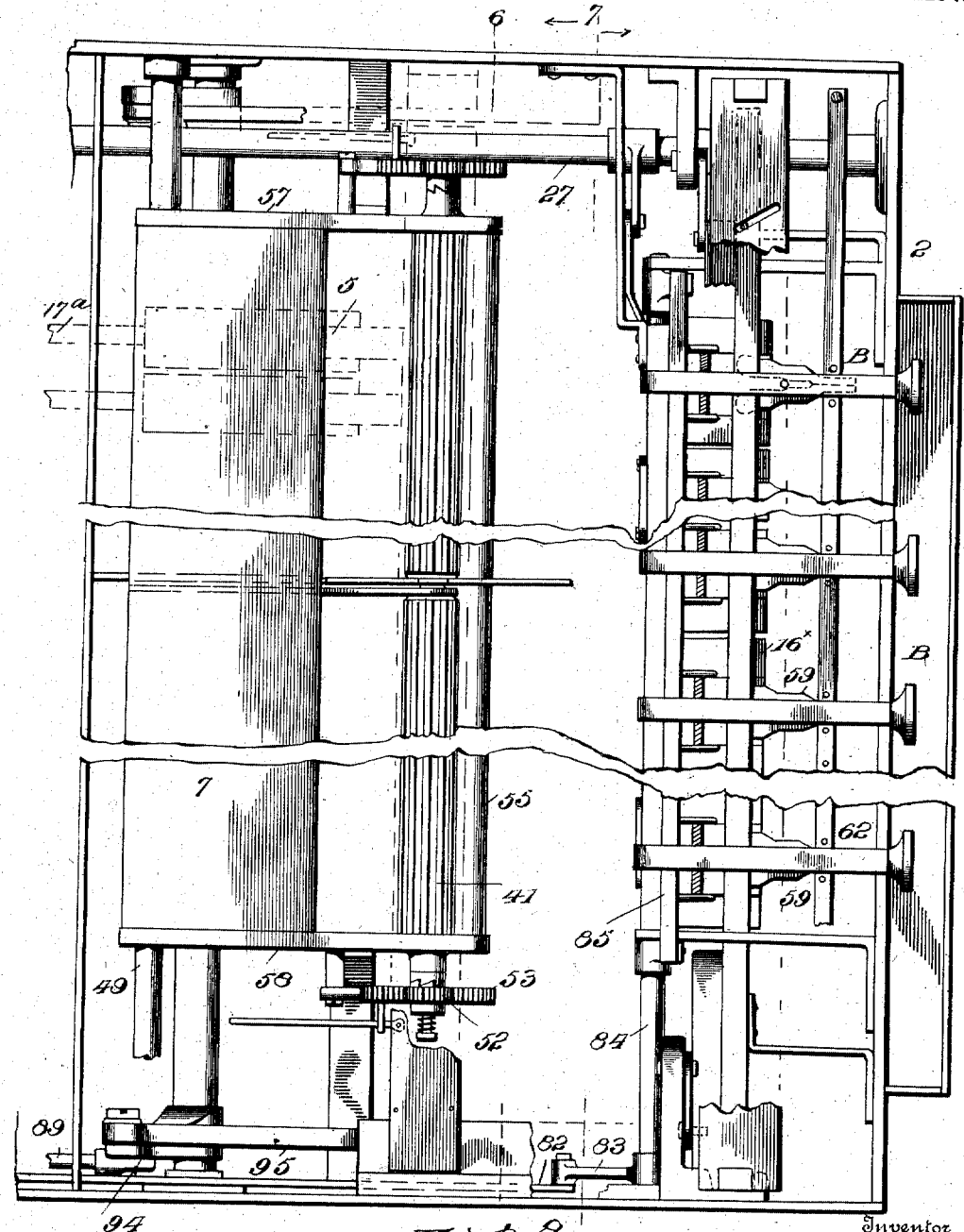

C. H. OCUMPAUGH.
VOTING MACHINE.
APPLICATION FILED DEC. 7, 1903.

984,149.

Patented Feb. 14, 1911.
14 SHEETS—SHEET 8.

Witnesses

Inventor
C. H. Ocumpaugh
By Benj. R. Catlin
Attorney

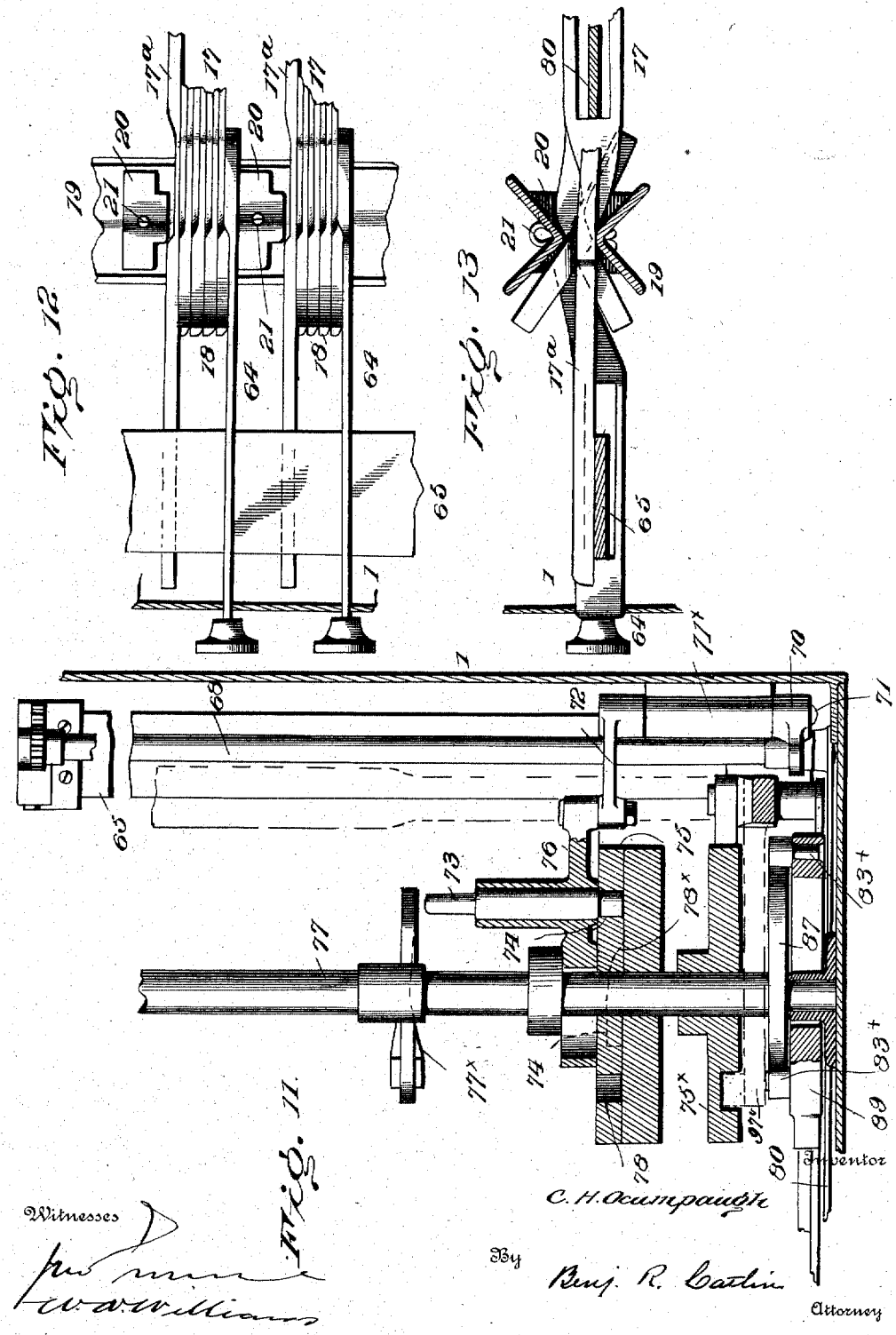

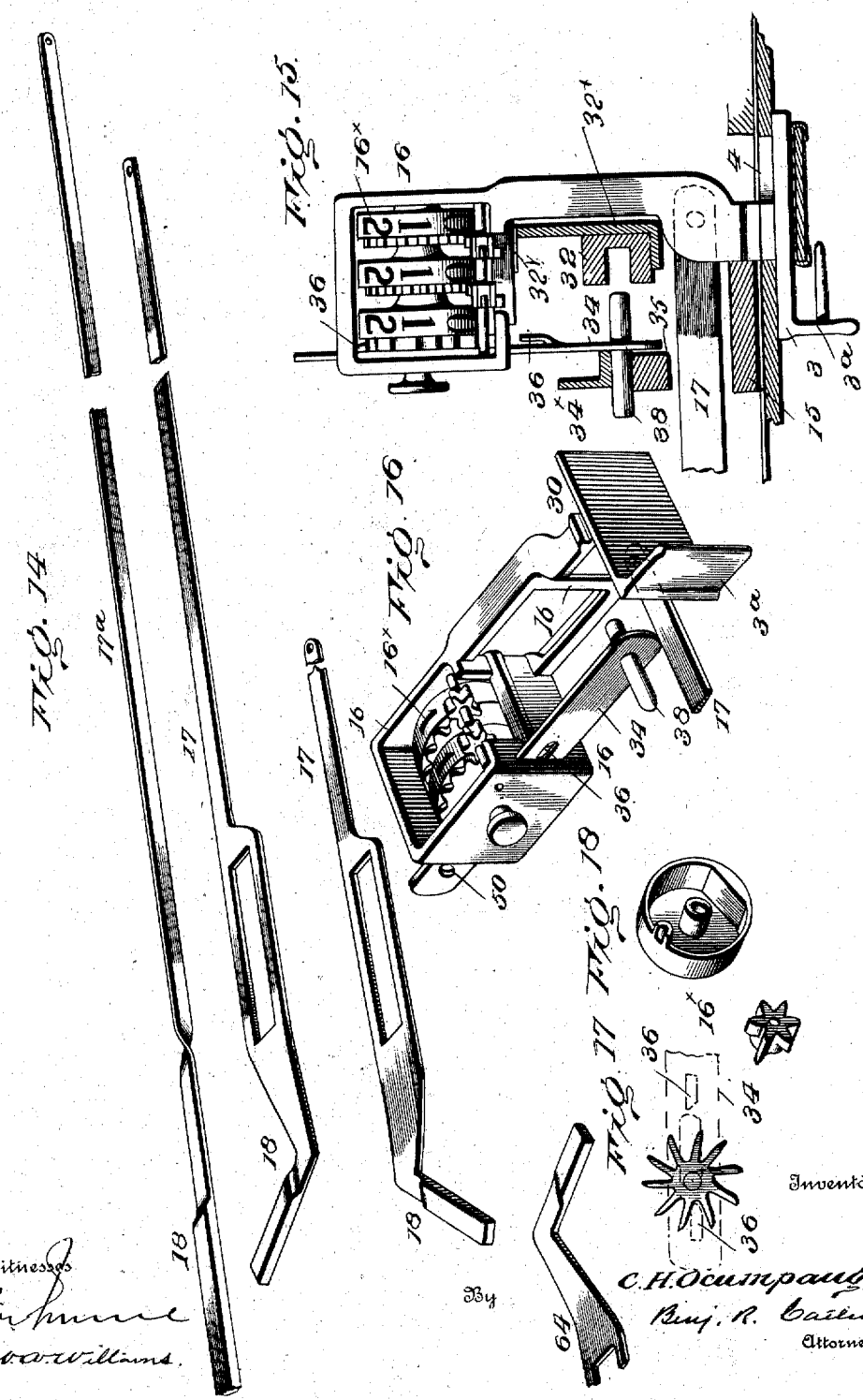

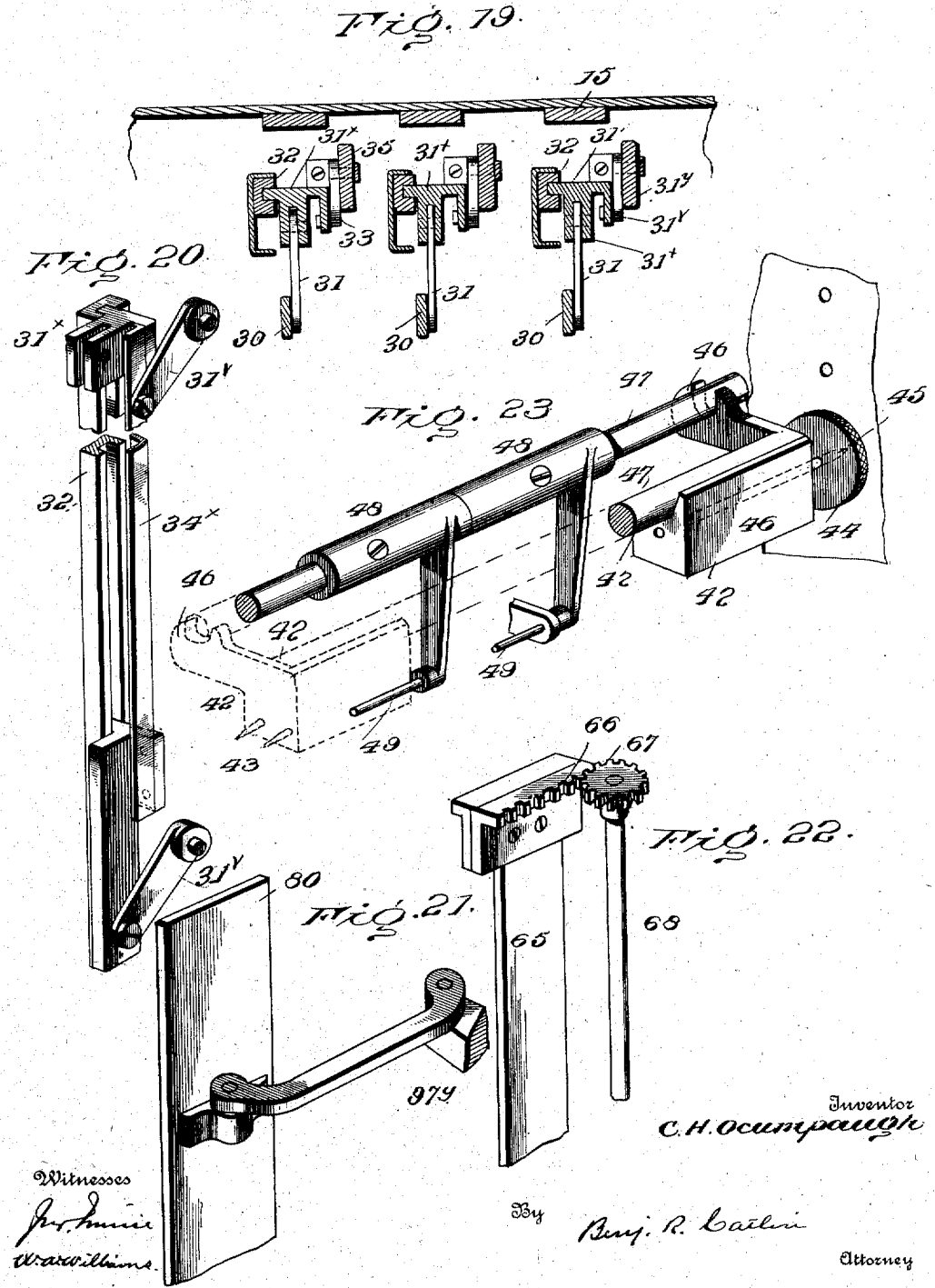

C. H. OCUMPAUGH.
VOTING MACHINE.
APPLICATION FILED DEC. 7, 1903.

984,149.

Patented Feb. 14, 1911.
14 SHEETS—SHEET 12.

Witnesses

Inventor
C. H. Ocumpaugh
By Benj. R. Catlin
Attorney

C. H. OCUMPAUGH.
VOTING MACHINE.
APPLICATION FILED DEC. 7, 1903.
984,149.
Patented Feb. 14, 1911.
14 SHEETS—SHEET 13.
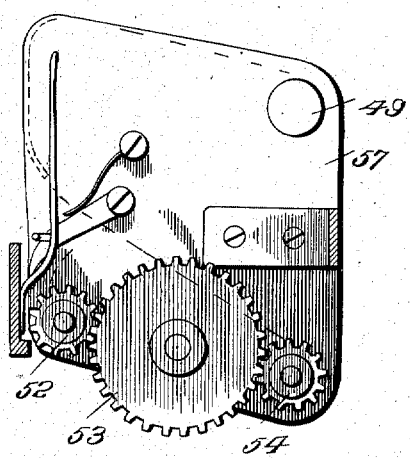
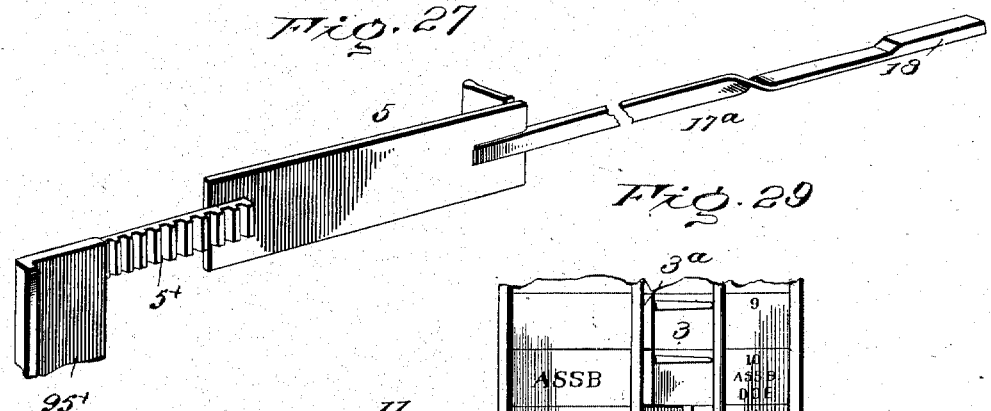
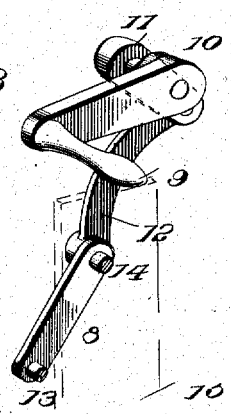
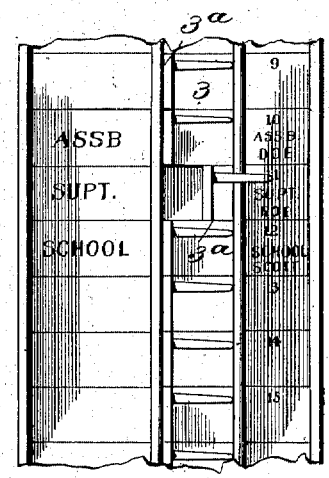
Inventor
C. H. Ocumpaugh
Witnesses
By Benj. R. Catlin
Attorney

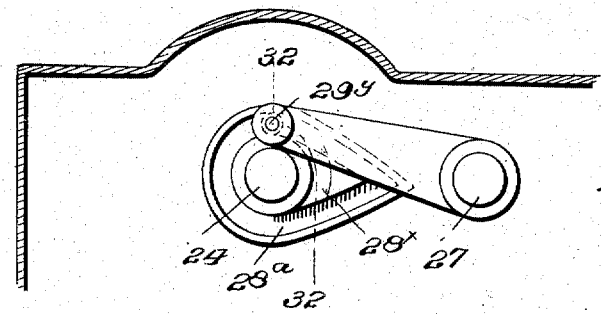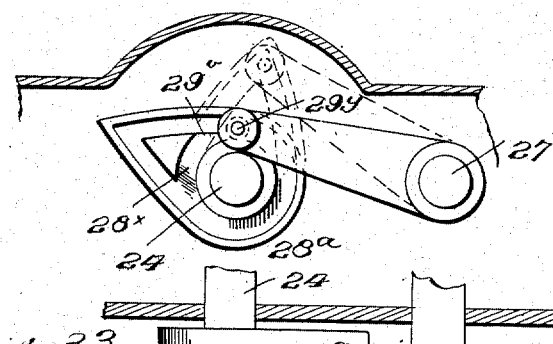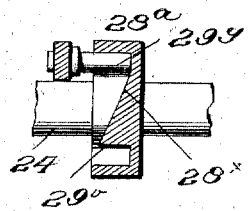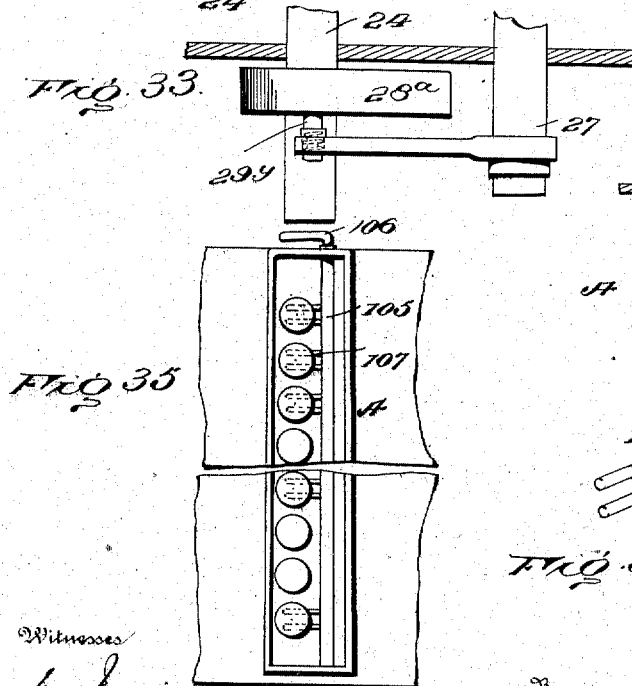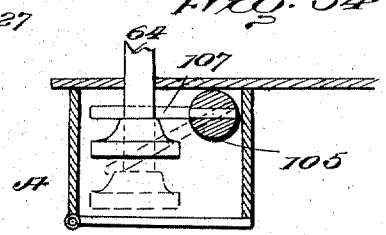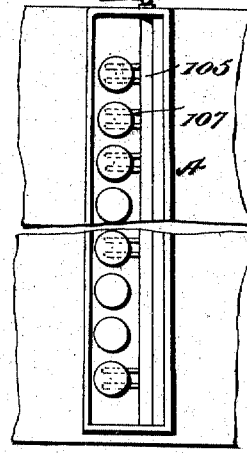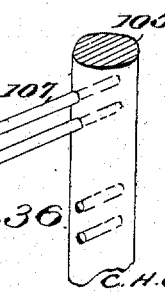

UNITED STATES PATENT OFFICE.

CHARLES HERBERT OCUMPAUGH, OF ROCHESTER, NEW YORK.

VOTING-MACHINE.

984,149.  Specification of Letters Patent.  Patented Feb. 14, 1911.

Application filed December 7, 1903. Serial No. 184,187.

*To all whom it may concern:*

Be it known that I, CHARLES H. OCUMPAUGH, a resident of Rochester, in the county of Monroe and State of New York, have invented certain new and useful Improvements in Voting-Machines; and I do hereby declare the following to be a full, clear, and exact description of the invention, such as will enable others skilled in the art to which it pertains to make and use the same.

This invention relates to voting machines, and has for its object to provide a simple, compact and certainly-acting machine for indicating and registering votes.

The invention consists in the construction and combinations hereinafter described and particularly pointed out.

Figure 9:
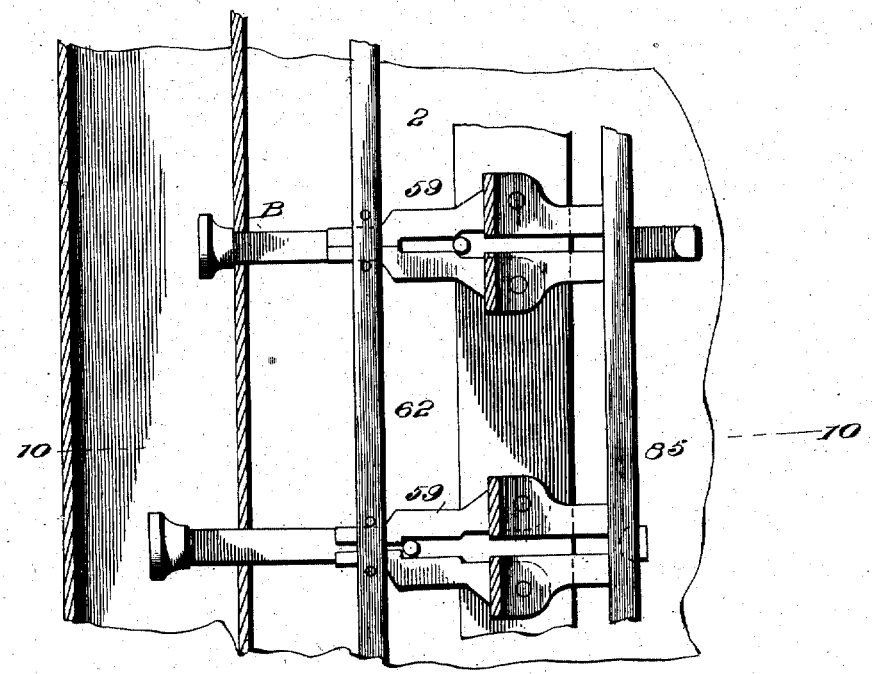
Figure 10:
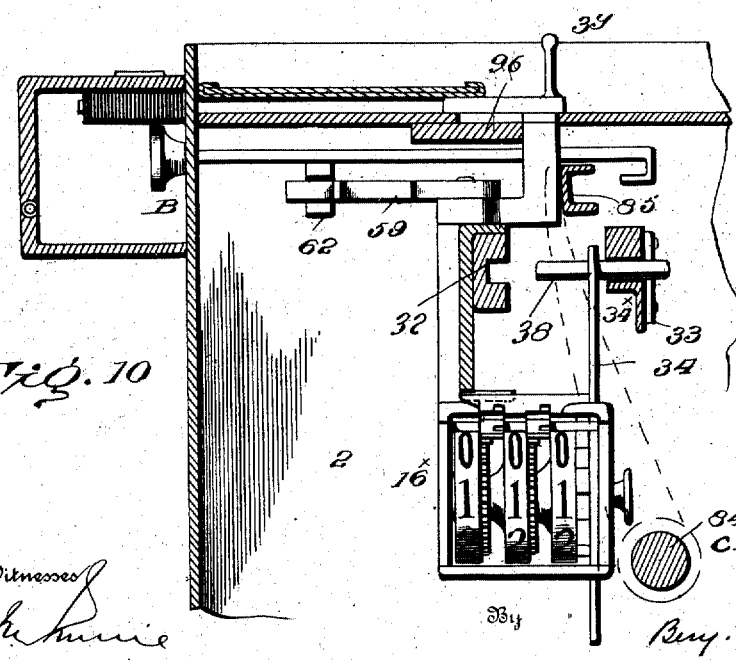
Figure 24:
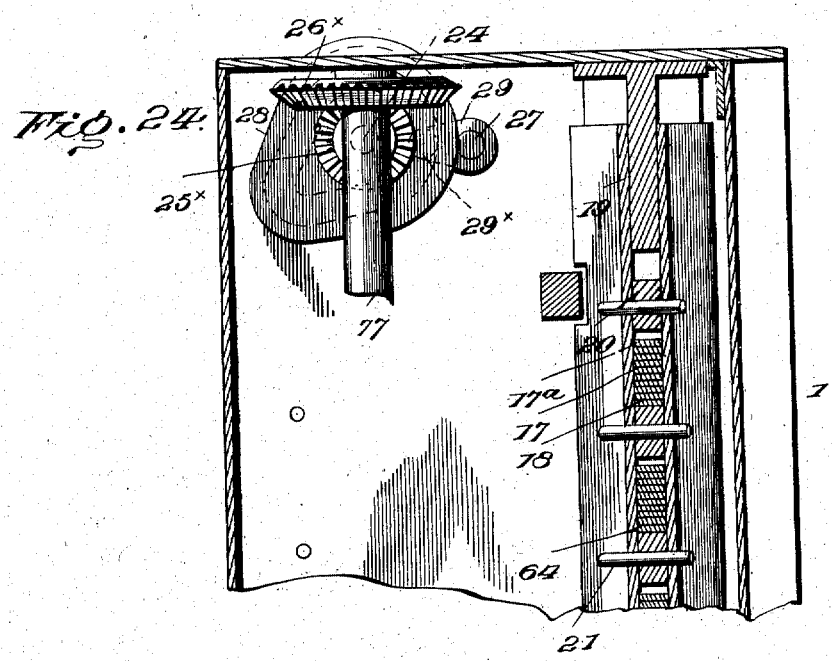
Figure 25:
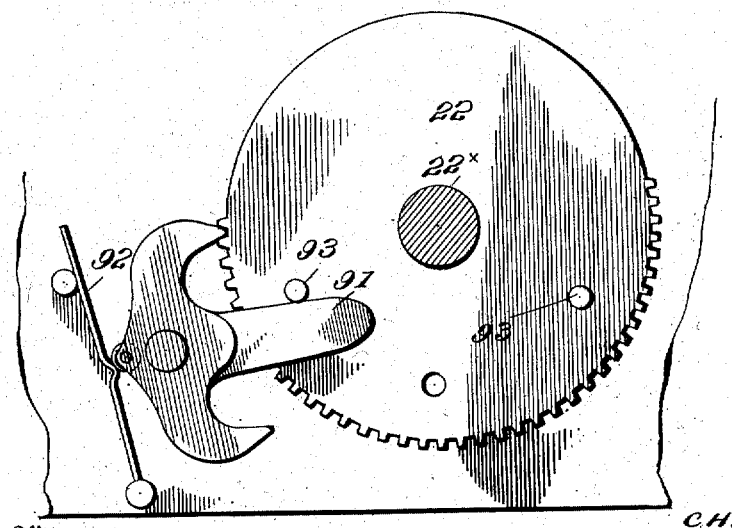

In the accompanying drawing: Figure 1 is a perspective of the machine, a voter-inclosing curtain being shown disposed as immediately before a voter approaches the face of the machine, the representation of said face being partially diagrammatic and the machine support in part broken away, and details indicated in limited number. Fig. 2 is a rear elevation, the back being removed and multiplication of various details being omitted. Fig. 3 is a horizontal section on line 3—3 of Fig. 1. Fig. 4 is a similar section partly broken away. Fig. 5 is a vertical section on line 5—5 of Fig. 3. Fig. 6 is a like section on line 6—6 of Fig. 8. Fig. 7 is a like section on line 7—7 of Fig. 8. Fig. 8 is a front elevation of the independent vote mechanism and of the question mechanism. Fig. 9 is a partial vertical section looking to the front of the lockout device of the question mechanism. Fig. 10 is a horizontal section on line 10—10 of Fig. 9. Fig. 11 is an enlarged vertical section on line 11—11 of Fig. 4. Fig. 12 is a partial enlarged front elevation of the official lockout mechanism. Fig. 13 is a horizontal section of the same. Fig. 14 is a perspective view of several lockout bars. Fig. 15 is a plan of the register-frame, register and keys, connecting register-actuating devices being shown, in section. Fig. 16 is a perspective view of a register. Figs. 17 and 18 are perspectives of parts of a register. Fig. 19 is a horizontal section on line 19—19 of Fig. 5. Fig. 20 is a perspective view of the register actuating bars shown in cross section in Fig. 15. Fig. 21 is a perspective of the main resetting bar. Fig. 22 is a partial perspective of the official lockout devices for the group. Fig. 23 is a broken perspective of devices for "Indorsed in a group voting." Fig. 24 is a section on line 24—24 of Fig. 2. Fig. 25 is a plan of the gear moved by the curtain frame, a reversely acting holding-pawl being shown. Fig. 26 is a plan of the gearing which operates the paper feed for the independent vote. Fig. 27 is a broken perspective of an interlocking strap with a key attached and with a rack and pertaining to the independent vote mechanism. Fig. 28 is a perspective of the levers of the party vote mechanism. Fig. 29 is a front elevation of a part of the face plate showing one of the keys in voted position. Fig. 30 is an end elevation of the shafts that immediately reciprocate the register-actuating pawl-slides. Fig. 31 is a similar view partially indicating the movements of the cam connected to one shaft and the pin-carrying crank connected to the other. Fig. 32 is a section on line 32—32 of Fig. 30. Fig. 33 is a broken plan of the shafts, cam and crank. Fig. 34 is a section of the box containing the official lockout keys, and devices for limiting their action to fewer than the whole number of offices. Fig. 35 is a broken elevation of the lockout key box and devices for actuating all the lockout keys except two. Fig. 36 is a broken perspective of a shaft having pins adapted for use in actuating locking out keys for the whole or for any desired number of offices.

Numeral 1 denotes the left, 2 the right hand end of the machine. As shown in Figs. 1 and 2 there are on the face plate of the machine eleven vertical columns each divided into thirty sections. The left hand column is to contain the list of offices to be voted for. The eight columns to the right each represents a political party and contains thirty indicators or keys denoted by 3, movable in slots 4 (see Figs. 3, 5, 16 and 29) and having an index finger 3ª for a name plate. The next or tenth column to the right contains thirty cover-plates denoted by 5 each of which normally closes an opening 6 but which if the voter so desires (see Fig. 3) can be moved laterally to permit an irregular vote to be written on the web of the paper behind the face plate. The regular indicator keys corresponding to an office are in the same horizontal line with the title of the office and in the same row also is a cover-plate 5 for the opening 6 in the face plate in front of a platen 7 over which paper is moved for the writing of an irregular or independent vote, and in said row is also an indicator key 3ˣ for a question vote.

*Straight ticket, individual and split ticket voting.*—9 (see Figs. 1, 5, and 28) denotes a straight ticket key handle or indicator (one of a series including all parties) fixed to a short shaft 10 supported to turn in a bearing in the front plate of the machine. Fixed to shaft 10 is an arm 11, and 12 denotes a connecting rod pivoted to said arm 11 and to an arm 8, the said arm 8 being pivoted at 13 to the face plate. The pivot 14 which connects arm 12 and arm 8 also connects them to a straight ticket bar 15. By means of the handle 9 and the described arm and connections, the bar 15 can be moved with the effect to push into a voted position all the register cases 16 and their contained registers in the particular party column represented by the party indicator handle 9 operated for the purpose. These register cases (see Figs. 12 to 16) are each connected to a strap 17 which has a thickened edge or wedge-shaped interlocking end 18 adapted to coöperate with fixed bars 19 and abutments 20 to lock out all other straps 17 and thereby lock out all the corresponding indicators or register cases 16 and registers 16ˣ carried by the straps. The abutments 20 are removable being held in place by removable pins 21 which pass through the bars and abutments as shown.

In the drawing eight party columns and keys for thirty offices are indicated. For each office there are eight register cases 16 each with a key and interlocking strap. There are also thirty irregular vote covers or indicators 5. And there are also register cases 16ˣ keys 3ʸ and interlocking wedges 59 for question votes. Obviously the particular number of keys and registers are not essential. The regular and irregular voting keys have similar locking devices and also similar lockout mechanism situated at the left hand end of the machine. The question key has an interlock and lockout of special construction at the right hand of the machine. The regular indicators when used for group voting have a special arrangement as will be more particularly described.

The above described operations, effected by the regular or party ticket key or handle 9, places all the registers corresponding to the party ticket in what may be styled the voted position. The actual voting, that is the registering of the voter's choice, is effected upon his leaving the face of the machine by mechanism to be hereinafter described.

If the regular indicator or party handle or lever 9 be not operated nor the corresponding party or straight ticket indicators, thereby moved to voted position, the operation may be effected by moving separately each indicator together with its strap having a lockout wedge by means of the individual indicator handles or keys 3. That is keys 3 can be separately operated to do what may be effected by one operation of key 9.

If the voter chooses he can split a ticket by first using the regular or party key 9 with the effect to move all of his preferred-party registers into voted position and then by means of one or more individual keys 3, returning any other individual key preparatory to voting for a candidate of another party for the same office or for an irregular or unnominated candidate.

In voting, the machine is placed with its face toward the inspectors, and its mechanism is in normal condition as the voter approaches it, all classes of indicators being locked against movement except two series of officially controlled lockout handle bars A and B on the respective ends of the machine. By the handle attached to the curtain support and connected as above indicated to the operating mechanism, the voter moves the curtain to inclose himself in front of the machine. This movement unlocks all the indicators, but does not affect the official lockouts.

The lockout indicators at the ends of the machine are protected against being tampered with by the voter, by means of a box like cover which may be provided with hinges and locks if desired. Each register case is fixed to, and is therefore a part of the indicator, and when an indicator is actuated or moved to voted position, its register is moved with it, and also its interlocking strap 17 and the indicators can be freely moved into and out of voted position without actuating its register.

When the voter has indicated his choice he removes the curtain as he leaves the face of the machine, by means of the curtain frame handle 40 and thereby actuates all the registers of the selected indicators, resets the indicator and locks them in their reset or normal position as elsewhere described.

On the top of the machine (Figs. 1, 2, 5, 15 and 25) is a plate 22 rotatably supported by preference on balls suitably disposed in a groove on a disk or plate 23. To gear 22 is connected the curtain support. The gear 22 has a short shaft 22ˣ connected to a horizontal shaft 24 by means of gears 25 and 26. This shaft 24 oscillates a parallel shaft 27 by means of a cam 28 and a crank arm 29, (see Fig. 24).

29 denotes a crank pin traveling in the groove of the cam shaped substantially as indicated whereby a complete rotation of shaft 24 oscillates the shaft 27. This shaft has arms 30 connected loosely by link 31 with a casting 31ˣ to which is fixed a register-actuating-grooved bar 32. Said casting also carries a bar which normally stops, and on suitable occasion, returns the register-actuating pawl bar or slide 34. Said casting is suspended by links 31$^y$ from a post 31$^y$ fixed to the casing.

The register cases or frames 16 are fixed to the keys 3 supported in the face plate slots, the said frames being further supported by a ledge 32$^v$ on the fixed bar 32$^x$ (see Fig. 15). Said bar 32$^x$ guides and stops the suspended bar 32 in its backward and forward movements. The bars 32 and 34$^x$ are operatively connected to shaft 27, the latter by a link 34$^v$ and the former by a link 31 each link being connected to a separate arm fixed on the shaft 27 as indicated. The bar 34$^x$ is supported from fixed bar 35 by links 33, and the bar 32 from a post 31$^y$ by a link 31$^v$.

It will be understood that by suitably rocking shaft 27, the bars 34$^x$ and 32 are moved backwardly whereby bar 32, having been engaged by pin 38, moves the pawl bar. Bar 34$^x$ is by the same shaft and the same movement carried out of the way of the rear end of said pin and subsequently returned to cause the return of the pawl bar when shaft 27 is returned, the return movement of the pawl bar being limited by a fixed bar 35.

36 indicates pawls carried by the slide 34. 38 denotes a pin fixed to said slide both being movable with the register frame and key with the effect to enter the pin in the grooved register-actuating bar 32, this pin being entered in the groove when the register is moved by the key to indicate the voter's choice. The same key movement interlocks by drawing the wedge 18 of the strap 17 between abutments 20 to lock out other straps and to immediately lock out other keys and registers. This pin extends to the left of the pawl slide a sufficient distance to be always in the path of the pawl-slide-holding and returning bar 34$^x$. This grooved bar 32 is reciprocated to actuate the two-step-pawl-slide to operate the register by the outgoing voter who by a handle 40 (see Fig. 1) moves a curtain frame and curtain thereby disclosing the face of the machine and suitably turning shafts 24 and 27, through connections before referred to. A half rotation of gear 22 by means of the handle effects a complete rotation of the cam 28 and a reciprocation of the two-pawl slide to move a register wheel one number.

*Group voting.*—Where a plurality, for example two persons, are to be elected to the same office and two nominations are made by one or more parties, two horizontal rows of indicators are set aside for this purpose. In such case the pin 21 which together with an abutment 20 separates groups of nine interlocking straps is withdrawn. This permits the operation of any two indicators in the two horizontal rows mentioned without regard to the location of the indicators the interlocking being in a group of eighteen in the particular case named.

"*Indorsed in a group*" *voting.*—Where two or more persons are to be elected to the same office and one of the candidates is nominated by a party and indorsed by another, which condition is known as "Indorsed in a group," I provide a special mechanism as indicated in Fig. 23 in which 42 denotes a frame having pins 43 at one end adapted to be entered in holes in one end of the case (see Fig. 5). The other end of the frame has a screw provided with a thumb piece 44 and a pin 45 adapted to be entered in the opposite end of the case. This frame has brackets 46 supporting a rod 47 upon which are adjustable sleeves 48 carrying pins 49 adapted to engage holes 50 in the register-actuating-pawl-bars 34. These sleeves are provided with screws or other means whereby they may be fixed to the rod 47. A plurality being fixed to the rod and the corresponding pins having been engaged with the pawl-slide moved to voted position by the outgoing voter as described will actuate the other slide or slides by means of this connection with the rod 47. This connection of the register actuating slides is effected before the commencement of the voting by the proper official. The effect is that when the indorsed candidate is voted for in any party column the register in both (or all) the party columns are actuated and each register finally indicates the full vote. In the present instance the indications for the indorsed candidate are arranged in the same horizontal line.

*Irregular voting.*—To enable a voter to vote for any desired person whether or not the person is nominated, his name not appearing on the face of the machine, the series of openings 6 for movable indicators comprising cover-plates or covers 5 having handles or keys 3$^x$ before mentioned is provided. Each of these covers is connected to an interlocking strap 17$^a$ having a thick portion or wedge 18 extending to the left beyond the point of interlocking between bars 19 a sufficient distance to permit the cover to be moved to the right to the full extent of the key opening 6 in the face plate and still leave the thickened part of the strap 17$^a$ in locked position. This particular strap unlike the others, has no angles at its interlocking end, being made straight to avoid contact with the resetting bar 65 described later.

Either a regular indicator 6 or an irregular indicator cover 5 having keys 3$^x$ can be moved but not both at the same time because of interlocking. Each cover 5 is provided with a rack (see Figs. 3 and 27). When a cover is moved to the right, this rack meshes with and moves the long pinion 41 and by means of pinions 52, idler 53 and pinion 54 turns a spool 55 and winds thereon a portion of a web of paper which web has one end attached to the spool 55 and the other to a spool 56. Between the two spools the paper passes across the platen arranged with its face in a plane parallel with, directly behind, and close to the openings 6 which are exposed when the covers 5 are suitably moved. On the portion of paper which passes over the platen adjacent an opening, the voter is allowed to write his choice of a candidate for any office represented by an indicator.

It will be noted that the cover 5 extends to the left of the handle and when moved to the right will continue to cover the opening until the rack has passed the pinion, so that the paper has ceased its movement by the time the cover is moved sufficiently to disclose the opening. In the present instance there are two pairs of spools, one pair situated above the other, and each pair provided with a long pinion 41. Each of the two long pinions coöperates with a pinion 52 to drive a spool pinion 54 by means of an intermediate gear or idler 53.

In order to reduce the cost of replenishing the paper, it is divided into two webs, one for the upper part of the machine, and the other for the lower. Each web of paper has two spools, one for the blank paper and the other for winding thereon the recorded votes. The axes of the two spools for the blank paper are coincident and the two spools for receiving the recorded votes also have their axes coincident. There are also two long pinions corresponding with the spools, and the axes of these are coincident, (see Figs. 6 and 8).

There is usually but very little irregular voting for the higher offices such as governor, lieutenant governor, etc., it being much greater for local offices, since candidates for such offices are usually personally known to the voter. In my present arrangement this latter class of offices is represented by the lower part of the face plate of the machine, and by appropriate paper-holding spools so that the web-holding spool for local offices can be separately replenished while for the majority of elections the upper web-holding spool of paper will not need replenishing.

Each of the paper rolls is rotatively supported by suitable trunnions in a frame comprising plates 57 and 58 joined by bars 49 and platen 7. The shaft of pinion 41 is journaled in the same plates and has on one end a pinion 52 which through an intermediate gear 53 drives another pinion 54 fast on the paper spool or roll shaft 55 which is thereby adapted to wind the paper from roll 56.

*Question voting.*—At the right hand of the machine is the question column consisting of thirty indicators arranged in pairs, one of the indicators representing the word "Yes" or "For" and the other the word "No" or "Against." The question-voting mechanism (see Figs. 3, 7 and 10) comprises the indicators and register cases 16ª similar to the regular indicators 16 except as to the dimensions of their faces or keys 3ʸ. The mechanism is substantially the same and the registers are actuated in the same manner as are the registers belonging to the regular indicators. The interlocking mechanism however is distinct and separate. Each of the register frames and indicators is pivotally attached to an interlocking wedge 59. The wedges belonging to a pair of question indicators are arranged in pairs and the thin edge of the wedges in normal position extends into an opening in a vertical bar 62 the opening or hole being of such size as to permit the insertion of the thickened portion of one wedge but not the insertion of two at the same time. The hole, however, is of sufficient size to contain the thickened portion of one wedge and the thin portion of its fellow. The construction allows one only of the indicators of a pair to be actuated.

*Question lockout.*—On each question lockout bar carrying the interlocking wedge is a stud which can be moved between a pair of interlocking wedges 59 and so spread them that the thickened portion of neither wedge 59 can be inserted in the opening in the vertical bar 62, thus locking the pair of question indicators against movement. The cover B, under control of officials, prevents intermeddling with this lockout.

*Interlocking system.*—The interlocking system is shown in Figs. 3, 12, and 13. The straps 17 before mentioned are arranged with thickened wedges 18 directed alternately to the right and left as indicated. They are divided into groups of nine each by the movable pins 21 extending between the pair of vertical bars 19. These bars are suitably supported and at each end fixed to the machine case and between abutments 20. Each group also contains a lockout strap 64. The space between two pins 21 is only sufficient to permit one (or any predetermined number) of the thickened parts 18 to be drawn between them. In the present instance eight of the straps 17 in the same group are connected each to a separate register case 16 all being in the same horizontal line. There is also one strap 17ª connected to the movable cover-plate 5 which covers the opening for the irregular vote in the same horizontal row as the indicators belonging to the same group of straps. The movement of any of the indicators including the lockout strap, indicator, or key 64 associated in the group with the register-carrying straps moves a strap and locks all the others. Two or more groups of nine may be thrown into one for indorsed group voting by removing the pin or pins 21.

*Resetting official lockouts.*—The official lockouts for regular indicators are reset on the exit of each voter to normal position by means of the vertical bar 65 which extends through slots in the interlocking lockout straps 64 (Figs. 2, 3, 4, 12, and 13) which bar 65 is attached at each end to a rack bar 66 suitably supported from the machine frame. The teeth on the rack bars 66 mesh with pinions 67 at each end of the shaft 68 (Figs. 3, 4, and 22). The shaft 68 which has suitable journals in the frame is rotatively reciprocated by means of a rack 69 at the outer end of an arm 70 which engages with the pinion 67. The arm 70 is rigidly attached at its other end to shaft 71 supported to turn in a fixed bearing $71^x$ and there is also an arm 72 rigidly attached to said shaft 71. The free end of said arm 72 is pivotally connected to the sliding pawl-pin-carrying bar 76 which has an independently movable cam pin 73 engaging slot 74 in the disk 75 (see Figs 4 and 11). The disk 75 is rigidly secured to the vertical shaft 77 which is connected by bevel gears $25^x$ and $26^x$ (see Figs. 2 and 24) to the shaft 24 situated parallel to the top of the machine, the latter shaft being connected by bevel gears 25 and 26 to a rotary disk or gear 22 actuated by the outgoing voter who moves the curtain frame to open the curtain in leaving the booth. See Fig. 5. To insure this operation the cam slot in disk 75 has two paths or courses of travel for the cam pin 73 which engages with it, one course 78 being an arc of a circle and inoperative (see Figs. 4 and 11). This is the course which the pin travels when the curtain is moved by an incoming voter. The other course 79 is eccentric and by means of the cam pin moves the sliding arm 76 by means of arms 72 and 70 fixed to shaft 71 and gives movement to the resetting bar 65 as the voter leaves the machine. Said two courses are situated in parallel planes and the pin is lifted from the lower situation of the (see broken lines Fig. 11) operative course to that of the inoperative by an inclined part $78^x$ and is suitably returned by an inclined part $77^x$ carried by shaft 77. It will be understood that the pin 73 travels in the groove concentric with the shaft when the voter enters and in the eccentric groove when he leaves the booth. The official question lockout is reset by the same shaft 77 through the medium of the connecting rod 80 sliding in a bearing 81 and connected by a link 82 to an arm 83 fixed on shaft 84 having arms operatively connected to the question lockout bar 85. (See Figs. 4, 7, 8, 9 and 10.)

*Resetting regular indicators.*—The indicators 3 are reset by means of the bar 80 which extends through openings in the straps 17 and $17^x$. The bar 80 is shown in Fig. 3 in normal position, that is, with the regular indicators locked against movement. As the voter approaching the face of the machine closes the curtain by means of the curtain frame handle he, by means of intermediate mechanism including gears 25, 26, $25^x$, $26^x$ and their shafts turns the resetting shaft 77 and its cam disk having a groove $97^w$ co-acting with a pin on the bell crank having arms $97^v$ and $97^y$, which latter suitably moves the regular resetting bar 86, (see Figs. 4 and 11) with the effect through intermediate mechanism, including gear 22 and shaft 77 to move the bar 80 to its inoperative position. Shaft 77 also drives a shaft 81.

*Resetting the irregular vote mechanism.*—The irregular indicators or cover-plates are reset as the voter leaves the machine by means of the shaft 77 and intermediate devices (Figs. 3, 4 and 11). Fixed to said shaft is a cam 87 rotating between the pins 83 carried by a rod 89 which thereby actuates a lever 94 connected by a link 95 with the resetting bar for the irregular vote.

*Resetting question indicators.*—The question indicators are reset by bar 96, immediately connected to and operated by the resetting shaft which also resets the regular indicators. It is necessary for the question indicators resetting bar to be inoperative as a locking bar at all times except in the operation of resetting. Otherwise it would interfere with the official lockout. It is therefore immediately returned to the normal position by the resetting mechanism. This mechanism comprises the crank arm 97 and its supporting shaft 90. The arm 97 is reciprocated by a bar $97^x$ connecting with a bell crank arm $97^y$. The arm $97^y$ is fixed to an oscillating shaft, and $97^v$ is an arm fixed to the same which arm carries a pin traveling in a groove $97^w$ in a cam fixed on shaft 77 whereby the question resetting bars are reciprocated.

To prevent the return movement of the curtain or barrier after partial movement from either of its two positions I provide a double acting pawl 91. The pawl is temporarily held in either of two positions by a spring 92 and is tripped by pin 93 as the actuation of the gear 22 brings one or the other of said pins against a pawl tooth whereby the pawl is reversed and another made operative.

98 denotes a cover for the pawl and spring.

99 indicates a spring stop for the curtain frame coöperating with the spring $99^x$ carried by a frame member.

The machine case is provided at its rear preferably with doors 100 so constructed and arranged that a single key and lock 101 will suffice for a plurality of doors. Thus the middle doors having hinges 102 may open oppositely and give access to one or more cords or chains 103 connected to bolts 104 to provide for retracting the bolts to permit the spring of the other doors which open oppositely to those first named. In the drawing chains are indicated for a door at the right hand end of the machine.

Referring to Figs. 30 to 33 inclusive numeral 28ª denotes a two-course cam on shaft 24 adapted to reciprocate shaft 27 to reciprocate pawl slide 34 (see Figs. 15 and 16) by means of an arm 30 and other intermediate devices before described (see Fig. 7). The movement of shaft 24 is caused by the ingoing voter and has no effect on shaft 27 for the reason that the cam-controlled pin $29^y$ travels in the arc of a circle of which the short groove $28^x$ is a part. When however shaft 24 is oppositely moved by the outgoing voter the cam pin is prevented from entering the groove $28^x$ by a shoulder $29^y$ caused by the inclination of the bottom of said groove, indicated in Fig. 32 and is compelled to take the longer path whereby shaft 27 is quickly reciprocated. The pin $29^y$ is movable lengthwise and held to the bottom of its paths by a spring. Preferably shaft 24 will be so geared to the curtain frame or equivalent as to be reciprocated by less than two entire rotations.

In Figs. 34 to 36 inclusive is illustrated means for actuating the lockout keys for one, two or more offices. This comprises a shaft 105 provided with a handle 106 and having apertures to receive removable pins 107, adapted to embrace the key straps or rods 64 behind their heads as indicated, whereby when the shaft 105 is turned all the keys so connected by pins to the shaft are actuated in either direction as desired. As indicated in Fig. 35 all the keys are operatively connected with shaft 105 except two.

I claim—

1. In a voting machine, a turnstile or lever, a shaft connected to the lever and having thereon a two-path cam, a stud engaged in the cam, and which cam by movement of the turnstile in one direction moves through one path of the cam and by movement of the turnstile in the reverse direction moves through the other path of the cam.

2. In a voting machine, a turnstile or lever, two-step registers, two-step register actuators, and means for moving the actuators of selected indicators, said means being at all times in connection with the turnstile but operating the actuators on the outgoing movement of the turnstile only.

3. In a voting machine, a face plate having an opening therein, an indicator adapted to slide back and forth in said opening and having an index finger, and a name plate situated behind the finger and between it and the body of the indicator.

4. In a voting machine, the combination of the indicator, a register, a register case containing a two step register actuator and attached to the indicator, and a support for the indicator and register, the movement of the actuator being at right angles to the movement of the indicator and register case.

5. In a voting machine, a turnstile, a movable part connected to said turnstile, a register, a vote indicator operative to indicate a vote without actuating a register, and a register-actuator having an extension thereon for engagement with the movable part connected to the turnstile, said part operating the actuator while the register remains at rest.

6. In a voting machine, a turnstile mediately actuating a register, said register, a register-actuator having thereon an extension, such as pin 38, for engagement with a movable bar or part connected to the turnstile, and the bar, said bar operating the actuator while the register is at rest.

7. In a voting machine, a turnstile mediately actuating a register, said register, a register-actuator having thereon an extension, such as pin 38, for engagement with a movable bar or part connected to the turnstile, and the bar, said bar operating the actuator while the register is at rest, the movement of the bar being parallel to the movement of the actuator.

8. In a voting machine, a turnstile, indicators, registers fixed to the indicators, register-actuators, a movable part connected with the turnstile for operating selected registers, and mechanism intermediate the turnstile and register-actuator-operating part adapted to move the latter at right angles to the face of the machine, the indicators and registers being movable parallel to the face plate.

9. In a voting machine, a turnstile, indicators, registers fixed to the indicators, register-actuators, a movable part connected with the turnstile for operating selected registers, and mechanism intermediate the turnstile and register-actuator-operating part adapted to move the latter at right angles to the face of the machine, the indicators and registers being movable parallel to the face plate, and said register-actuators mediately supported by the indicators and registers and movable therewith.

10. In a voting machine, a turnstile, a register actuator, a movable part connected with the turnstile adapted when operated to move the actuator, the movable part being capable of moving more than one actuator, and an alining bar or part connected to and operating with the first mentioned movable part to keep one or more actuators in proper alinement.

11. In a voting machine, an indicator, a register bodily movable by said indicator, a register actuator, a turnstile for moving the actuator, and the connected bars intermediate the turnstile and indicators for actuating and returning the register actuator.

12. In a voting machine, register actuators, a turnstile, a movable device extending parallel to the face plate and connected to the turnstile, and having two connected parallel bars both of which are moved on the outgoing movement of the turnstile, but only one of which is capable of moving the actuators.

13. In a voting machine, a register, a turnstile, a pair of connected bars, each bar being operatively connected to the turnstile and moved by the outgoing movement of the turnstile, one of said bars being a register-actuator-returning bar, and a register actuator situated between said connected bars.

14. In a voting machine, indicators, a turnstile, register actuators having an extension on each side, and movable parallel parts connected to the turnstile, one of the parallel parts being capable of contact with two sides of an extension on the actuator, the other part being capable of contact with but one side of the other extension.

15. In a voting machine, a movable reciprocating part, a register actuator having two extensions thereon, one to engage with said movable reciprocating part and the other extension to keep the actuator in proper alinement to engage with the said reciprocating part.

16. In a voting machine, a register case, an indicator fixed to said case and provided with an interlocking strap, a second register case with connected indicator and interlocking strap, said latter strap passing between the first named case and its indicator.

17. In a voting machine, a face plate, a register case and an indicator so connected as to form one piece, a support for the register case, the support for the indicator consisting of the face plate, said supports permitting a parallel movement of the indicator and register case.

18. In a voting machine, a face plate, a register case attached to and a part of an indicator, and a straight ticket bar between the face plate and the register case adapted to move the indicator.

19. In a voting machine, a register comprising an operating wheel, means for bodily changing the position of the register, a register-actuator movable with said register, a support for the register and its actuator, and means made operative on the actuator by said movement of the register and actuator for moving the actuator independently to actuate a wheel of the register.

20. In a voting machine, register actuators and a stationary bar for alining the actuators when brought in contact with the bar.

21. In a voting machine, a face plate having perforations therein, an indicator having a sliding movement which is parallel with the face plate, the indicators at all times covering the perforations in the face plate and having an extension forming a handle.

22. In a voting machine, a series of indicators each connected to a strap carrying a register and provided with an interlocking wedge, a series of lockout indicators each movable oppositely to the regular indicators and provided with an interlocking wedge, abutments inclosing between each pair both classes of indicator wedges, a turnstile, and means connected to said turnstile whereby indicators of either class may be re-set.

23. In a voting machine, a series of lockout indicators and a shaft or bar having adjustable parts thereon for engaging and moving the indicators when the shaft is moved.

24. In a voting machine, a series of lockout indicators and a shaft or bar having adjustable parts thereon for engaging and moving the indicators when the shaft is moved, the movement of the shaft from the direction of normal position moving the selected indicators, and the movement of the shaft toward normal position not moving any indicators.

25. In a voting machine, a series of lockout indicators, and a shaft or bar having adjustable parts thereon for engaging and moving the indicators when the shaft is moved, and means for returning the actuated indicators and shaft to normal position.

26. In a voting machine, indicators, a face plate, a device for holding a ticket on the face plate, said device being capable of locking a series of indicators against movement.

27. In a voting machine, resetting bars, a group of interlocking straps composed of two classes, the straps of one class having perforations, the resetting bar of one class operating through said perforations in the straps, and the resetting bar of the other class operating against an extension of a strap.

28. In a voting machine, three classes of indicators, an independent resetting bar for each class, the three bars being parallel.

29. In a voting machine, three classes of indicators, an independent resetting bar for each class, the three bars being parallel and capable of operation at the same time.

30. In a voting machine, a reciprocating turnstile, a shaft connected thereto, a two-path cam moved by the shaft, and a resetting bar connected with the cam, the cam when the turnstile is moved in one direction leaving the resetting bar at rest, and when moved in the reverse direction actuating the resetting bar.

31. In a voting machine, a shaft, a cam connected thereto, a resetting bar operatively connected to the cam, the said cam and connection reciprocating the bar during a movement of the shaft in one direction only, said bar resting during the return of the shaft.

32. In a voting machine, a shaft having a two-path cam, a cam stud engaging therewith and a second cam on the shaft for positively engaging the stud with the two-path cam.

33. In a voting machine, a shaft having thereon a two-path cam and a reciprocating cam stud engaging therewith, the movement of the shaft moving the cam stud longitudinally when moved through one path of the cam.

34. In a voting machine, a shaft having thereon a cam having two courses, a sliding bearing for a cam stud, a cam stud engaging the cam, and the sliding bearing moving laterally during a movement of the cam stud in one course of the cam.

35. In a voting machine, a shaft, a cam on the shaft, a resetting bar and a connection between the cam and the bar consisting of a cam stud having both a lateral and endwise movement during the movement of the shaft in one direction.

36. In a voting machine, a shaft, a cam on the shaft, a resetting bar and a connection between the cam and the bar consisting of a cam stud having both a lateral and endwise movement during the movement of the shaft in one direction, and a pivoted link forming a connection between the cam stud and the resetting bar.

37. In a voting machine, a turnstile, a resetting bar having a rack bar attached thereto, and a shaft having a gear thereon meshing with the rack bar, the turnstile with its connecting mechanism being adapted to turn the resetting bar when the shaft is actuated.

38. In a voting machine, a turn-stile, a shaft operated by movement of said turnstile, a cam disk on said shaft and having two courses, one concentric with the disk and shaft, and the other eccentric, a pin movable in the first course during one movement of the turn-stile and shaft, said pin being movable in the eccentric course during opposite movement of the turn-stile and shaft, vote indicators, lockout means for said indicators, and a resetting device for said means operated by said opposite movement.

39. In a voting machine, a turn-stile, a shaft operated by movement of the turnstile, a cam disk on said shaft and having two courses, one concentric with the disk and shaft, and the other eccentric, a pin movable in the first mentioned course during one movement of said turn-stile and shaft, said pin being movable in the eccentric course during opposite movement, means for transferring said pin from the concentric to the eccentric course of the cam, vote indicators, lockout means for said indicators, a resetting device for said means, another cam on said shaft, and a resetting device for the indicators operated by the latter cam.

40. In a voting machine, a turn-stile, a shaft driven by movement of the turn-stile, a cam on said shaft having a concentric course and an eccentric course in different planes, a pin adapted to travel in either course, means for moving said pin lengthwise to carry it from one course to the other, said pin being moved transversely by said eccentric course, indicators, lockout means, and a resetting device operated by said transverse movement of the pin.

41. In a voting machine, a turnstile, a shaft connected to the turnstile and having four cams thereon, three of the cams having separate cam studs connected to separate resetting parts, said resetting parts being capable of movement on the operation of the turnstile.

42. In a voting machine, a turnstile, a shaft connected to the turnstile, a cam on the turnstile having a cam stud engaging therewith, said stud being held against longitudinal movement but capable of lateral movement in one direction only.

43. In a voting machine, a turnstile, two register actuators, crank-arms so connected as to operate as one and having lateral extensions engaging with the actuators, connections between one of the actuators and the turnstile to operate the former when the turnstile is moved in one direction, the movement of one actuator causing a similar movement of the other actuator by means of the crank arms and extensions, said etxensions permitting a lateral movement of the actuators without operating the crank-arms.

44. In a voting machine, a turnstile, two register actuators, crank-arms so connected as to operate as one and having lateral extensions engaging with the acuators, connections between one of the actuators and the turnstile to operate the former when the turnstile is moved in one direction, the movement of one actuator causing a similar movement of the other actuator by means of the crank-arms and extensions, said extensions being of a length to permit a lateral movement of the actuators without becoming disengaged from the actuators.

45. In a voting machine, a machine face plate, indicators each carrying a register and sliding parallel with said plate, a pointer fixed to and carried by the indicator, and a candidate name plate.

46. In a voting machine, a series of sliding indicators each comprising a plate with its face extending parallel to the face of the machine, said plate having a longitudinal movement in fixed bearings, and a handle attached to the plate and extending at right angles to the face of the machine, and movable in lines parallel to said machine face.

47. In a voting machine, a series of sliding indicators each comprising a plate with its face extending parallel to the face of the machine, said plate having a longitudinal movement in fixed bearings, and a handle attached to the plate and extending at right angles to the face of the machine, and a pointer parallel with the face and fastened to an extension thereon, said parts moving in lines parallel to the machine face.

48. In a voting machine, a gear, a pawl, a resetting bar having an extension thereon and means for moving the bar to release the pawl from the gear by means of the extension.

49. In a voting machine, a turnstile, a shaft connected to the turnstile, a cam on on the shaft, a cam stud engaging with the cam and attached to one end of a bar, a crank arm to which the other end of the bar is attached, a resetting bar and a link connecting the resetting bar and the crank-arm, whereby on the movement of the turnstile the resetting bar may be moved.

50. In a voting machine, two resetting bars at opposite ends of the machine, and connections between the two bars so that they have simultaneously the same degree of movement.

51. In a voting machine, a turnstile, a resetting bar sliding in bearings and having a rock bar attached, a crank-arm having the end formed into a segment of a gear, a pinion meshing with both the rock bar and the crank-arm and connections between the turnstile and crank-arm for moving the resetting bar.

52. In a voting machine, a turnstile, a resetting bar at each end of the machine sliding in bearings and having a rock bar attached, a crank-arm having the end formed into a segment of a gear, a pinion meshing with both the rock bar and crank-arm, means between the turnstile and crank-arm for moving the resetting bar, and connections between the two resetting bars by which they operate simultaneously.

53. In a voting machine, a turnstile, two shafts, the first connected to the turnstile and the second connected to the first shaft, the movement of the first shaft in one direction not moving the second shaft, but the movement of the first shaft in the other direction moving the second shaft.

54. In a voting machine, a turnstile, two shafts, the first connected to the turnstile and the second connected to the first shaft, the movement of the first shaft in one direction not moving the second shaft, but the movement of the first shaft in the other direction moving the second shaft, the connection between the turnstile and the second shaft including a two-path cam and a longitudinally movable cam stud.

55. In a voting machine, a turn-stile, registers, means for putting selected registers in voted position, a cam moved by movement of the turn-stile, said cam having two paths, one operative and one inoperative, register operating means, an operating connection between said means and the cam comprising a pin coöperating with the cam, said pin during outgoing movement of the turn-stile being moved by said operative path of the cam, and said pin during incoming movement of the turn-stile moving along the inoperative path, whereby registers are only operated by outgoing movement.

56. In a voting machine, a reciprocating turnstile, three classes of resetting bars all connected with the turnstile, and moving with different speeds during the reciprocation of the turnstile.

57. In a voting machine, indicators, a turnstile, register actuators, two parallel shafts, one of the shafts on the movement of the turnstile moving the resetting bars, the other moving the register actuators of selected indicators.

58. In a voting machine, a turnstile, resetting bars, five parallel shafts, each operating a resetting bar, and connections between the turnstile and shafts so arranged that on the full operation of the turnstile the bars are all moved.

59. In a voting machine, a casing, voting devices comprising indicators which are operable from the front of said casing, and lockout means for said indicators comprising corresponding lockout indicators in an end of the casing at an angle to said front.

60. In a voting machine, a casing, voting devices comprising indicators which are operable from the front of said casing, indicators of different classes at different ends of said front, lockout means for said indicators comprising coöperating lockout-indicators for indicators of one class in one end of the casing, and lockout-indicators for indicators of another class in the other end of the casing.

61. In a voting machine, a casing having movable indicators on three sides thereof, the indicators on two sides thereof capable of locking indicators on a third side of the casing against movement.

62. In a voting machine, the combination of a straight ticket handle, registers for a party each register comprising a register-actuator, said registers being movable by said handle into and out of operative relation with a moving device for the register-actuators, and said moving device.

63. The combination of the straight ticket handle, the registers for a party, means for actuating the registers, said registers being movable into position for actuation by the handle, means for separately moving each register out of and into such position, and an interlocking device corresponding to each register to prevent moving more than a predetermined number of registers into said position.

64. The combination of the straight ticket handle, the registers for a party, means for actuating the registers, said registers being movable into position for actuation by the handle, means for separately moving each register out of and into such position, and an interlocking device corresponding to each register to prevent moving more than a predetermined number of registers into said position, said interlocking device comprising a strap connected to a register case.

65. The combination with a straight ticket handle, the registers for a party, means for actuating the registers, said registers being movable into position for actuation by the handle, means for separately moving each register out of and into such position, an interlocking device corresponding to each register to prevent moving more than a predetermined number of registers into such position, said interlocking device comprising a strap connected to a register case, and a register-moving key.

66. The combination with a straight ticket handle, the registers for a party, and means for actuating the registers, said registers being movable into position for actuation by the handle, means for separately moving each register out of and into such position, an interlocking device corresponding to each register to prevent moving more than a predetermined number of registers into such position, said interlocking device comprising a strap connected to a register case, and a register-moving key movable parallel with the face plate of the machine.

67. In a voting machine, the combination of the register, register case, key and interlocking mechanism, with a register-actuating device, each register being freely and independently movable without actuation into and out of position to be actuated.

68. In a voting machine, the combination of the register, register case, key and interlocking mechanism, with a register-actuating device, each register being freely and independently movable without actuation into and out of position to be actuated, and means for actuating the register comprising a barrier to access to the face of the machine.

69. In a voting machine, the combination of the register, register case, key and interlocking mechanism, with a register-actuating device, the register being freely movable without actuation into and out of position to be actuated, and means for actuating the register comprising a barrier to access to the face of the machine, said barrier supporting means for inclosing the voter at the face of the machine.

70. In a voting machine, the combination of the register, register case, key and interlocking mechanism, with a register-actuating device, the register being freely movable without actuation into and out of position to be actuated, and means for actuating the register comprising a barrier to access to the face of the machine, said barrier supporting means for inclosing the voter at the face of the machine and operative by an angular movement of about 180°.

71. In a voting machine, a plurality of register cases and registers, each case carrying a register and independently movable to carry its register into or out of operable situation, and a register-actuating-bar movably supported in each case.

72. In a voting machine, the combination of the register, the individually movable register case, the register-actuating bar supported in the case, a barrier, and a bar connected to be moved by the barrier to operate the register-actuating bar.

73. In a voting machine, the combination of the register, the register case, the register-actuating bar supported in the case, a barrier, a bar connected to be moved by the barrier to operate the register-actuating bar, and a key to move the register case and register-actuating bar into operative relation to the barrier-connected bar.

74. In a voting machine, the combination of the registers, the register case, the register-actuating bar supported in the case, and means for locking said bar, said bar and case being movable while in an operative situation without actuation of the register.

75. In a voting machine, the combination of the register, the register case, the slotted register-actuating bar supported in the case, and means for locking said bar, said means comprising a pin 49.

76. The combination of a register, a register frame, a frame-moving key, and interlocking strap, the frame, key, strap, and register being fixed together and together movable, with distinct means for actuating the register as a counter.

77. The combination of a register, a register frame, a frame-moving key, and interlocking strap, the frame, key, strap, and register being fixed together and together movable, with distinct means for actuating the register as a counter, said means comprising a separately and independently movable register-wheel-driving pawl.

78. The combination of a register frame, registers carried thereby, an interlocking strap fixed to said frame, and a resetting bar adapted to reset the straps and frame.

79. The combination of a register, a register-carrying frame, and an interlocking strap fixed to said frame, with a resetting bar, and a barrier movable by the voter, said barrier being mediately connected to the resetting bar.

80. The combination of a register, a register carrying frame, and an interlocking strap fixed to said frame, with a resetting bar, and a barrier movable by the voter, said barrier carrying means of inclosing the voter at the face of the machine, and said means.

81. The movable register frame, the register carried by the frame, the register-actuating bar also carried by the frame, the interlocking strap fixed to the frame, the indicator key fixed to the register frame and strap, and the slotted face plate, the key being movable in the face plate slots.

82. An interlocking strap provided with a voter's key combined wth a lock-out strap and abutments whereby the key may be made inoperative, a resetting device for the lock-out strap, and a barrier operated by the voter to actuate the resetting device.

83. An interlocking strap provided with a voter's key combined with a lock out strap and abutments whereby the key may be made inoperative, a resetting device for the lock out strap, and a barrier operated by the voter to actuate the resetting device, said resetting device passing through a slot in the lock out strap.

84. The combination of the rotatable plate having gear teeth, the shaft having a gear and driven thereby, a second shaft reciprocated by the shaft first named, and a register-actuating bar operatively connected to the reciprocated shaft.

85. The combination of the rotatable plate having gear teeth, the shaft having a gear and driven thereby, a second shaft reciprocated by the shaft first named, a register-actuating bar operatively connected to the reciprocated shaft, and the angle bar to support and guide the register-actuating bar.

86. The combination of the register, the movable pawl-holding register-operating pawl bar, a slotted pawl-bar-actuating bar 32, means to engage the two bars, and mechanism to move the slotted bar.

87. The combination of the register, the movable pawl-holding register-operating pawl bar, a slotted pawl-bar-actuating bar 32, means to engage the two bars, and mechanism to move the slotted bar, said mechanism comprising a lever actuated by the outgoing voter.

88. The combination of the register, the movable pawl-holding register-operating pawl bar, a slotted pawl-bar-actuating bar 32, means to engage the two bars, mechanism to move the slotted bar, said mechanism comprising a lever actuated by the outgoing voter, and a guide for the latter bar.

89. The combination of the face plate, registers, keys, and interlocking mechanism, said keys being movable parallel with the face plate to operate the interlocking mechanism, an inclosure movable to inclose the voter by an inward movement, and connections whereby the return movement of the inclosure actuates the registers whose keys have been put in voted position and returns and locks said keys and holds them locked until unlocked by the entrance movement of said inclosure.

90. The combination of two indicators, one representing an indorsed candidate, group interlocking mechanism, means whereby when one indicator has been moved to voted position it is reset by the movement of the other, registers, and mechanism for actuating registers corresponding to both indicators notwithstanding one has previously been reset.

91. The combination of two indicators, one representing an indorsed candidate, group interlocking mechanism, means whereby when one indicator has been moved to voted position it is reset by the movement of the other, registers, and mechanism for actuating registers corresponding to both indicators notwithstanding one has previously been reset, said mechanism comprising a shaft 22 and studs 29ª.

92. In a voting machine, a vote indicator of one party for a candidate, a vote indicator of another party for said candidate indorsed, interlocking means whereby but one of said indicators can be operated at one time, a register for each indicator, and operating means between each indicator and both registers whereby operation of either indicator counts on both registers.

93. Vote indicators, means for moving the indicator of a candidate of a party and the indicator of said candidate indorsed by another party comprising a connection permitting the putting of only one of the indicators in a voted position at one time, and adapted to reset a previously-actuated indicator by the actuation of the other, registers, and means for simultaneously actuating both registers corresponding to the two indicators, whereby the count for an indorsed candidate will be the same on both registers.

In testimony whereof, I have signed this specification in the presence of two subscribing witnesses.

CHARLES HERBERT OCUMPAUGH.

Witnesses:
E. C. HEMPEL,
A. M. ZIMMER.